(No Model.)

J. HUTCHINS.
VEHICLE SPRING.

No. 325,609. Patented Sept. 1, 1885.

WITNESSES
Edwin I. Yewell
Chas. H. Davis

INVENTOR
Joseph Hutchins
By L. W. Alexander
his Attorney

N. PETERS, Photo-Lithographer, Washington, D. C.

UNITED STATES PATENT OFFICE.

JOSEPH HUTCHINS, OF MIDDLEBURY, INDIANA.

VEHICLE-SPRING.

SPECIFICATION forming part of Letters Patent No. 325,609, dated September 1, 1885.

Application filed June 15, 1885. (No model.)

*To all whom it may concern:*

Be it known that I, JOSEPH HUTCHINS, a citizen of the United States, residing at Middlebury, in the county of Elkhart and State of Indiana, have invented certain new and useful Improvements in Vehicles, of which the following is a specification, reference being had therein to the accompanying drawings.

My invention relates to improvements in vehicles, and is designed to produce a vehicle of that class in which a longitudinal spring is employed to support the body that shall allow the greatest freedom of movement to the body, and also equalize the movement and operation of the spring and prevent rattling as the device wears.

The device is an improvement over that for which a patent was granted to me October 10, 1882, and numbered 265,812.

Figure 1:
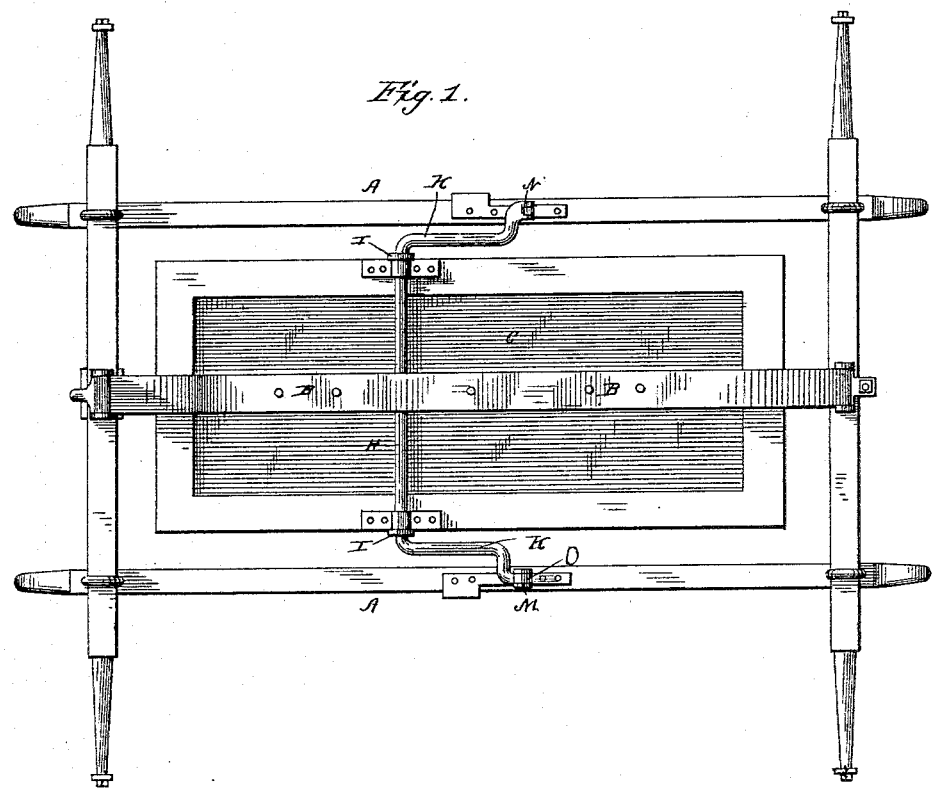
Figure 2:
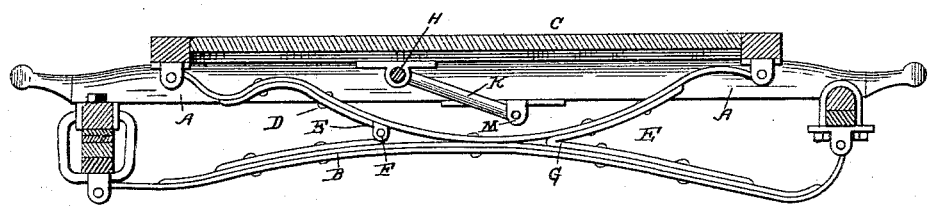

In describing the device reference is had to the annexed drawings, in which Figure 1 represents a plan view of the frame of the vehicle from below, and Fig. 2 a longitudinal section through the same.

To the rear axle and front bolster are secured the side bars, A. To the front and rear axles centrally, by means of shackles, the main spring B is secured, and consists of one or more leaves. It is also curved longitudinally downward toward each end, and has its rear end curved upward to the shackle.

The bottom frame, C, of the body has the spring D, pivotally fixed to each end by shackles, which do not allow any longitudinal play therein. This spring is curved upward from the center toward the ends, the rear end curving downward to the shackle and the front end curved downward and then upward in the shape of an elongated S to the shackle. It may consist of one or more leaves. The two springs are secured one to the other by bolts or rivets; also connecting the springs at front and rear are V-shaped leaves E, riveted or bolted to each and conforming to the divergence of the springs.

The V-shaped leaves may be jointed at the angle, as shown at F, or integral, as at G. The V-shaped leaves add materially to the efficiency of the spring as a whole, making its operation uniform throughout.

Pivoted to the under side of the body by suitable bearings is a bar or rod, H, having collars I, to prevent lateral movement of the said body. The rod has the ends bent at about right angles, so as to lie about parallel with the body, and between it and the side bars, as shown at K, and then continued with an L-shaped bend to pivotal shackles M on the said side bars. These shackles are shown as differently formed. The one at the top of the drawings and lettered N is for new vehicles, and the one at the bottom, Fig. 1, and lettered O, is for repairing.

When no load is in the body, the bar H, or, as it may be termed, the "equalizer," stands at an angle of about thirty degrees, more or less. When loaded, it falls to about a level. As it falls the body is forced forward and downward. This causes the springs to straighten somewhat, the difference being taken up by the rear curve of the lower spring and the forward S curve of the upper spring.

The equalizer causes a true longitudinal movement of the body and prevents all side motion.

The principal points of difference between the present device and the former one is the formation of the springs, the collars, and the equalizer, and the fixing of the upper spring in the forward shackle instead of allowing it a longitudinal movement therein.

As the springs and equalizer act against each other, in a measure all wear is taken up and rattling prevented.

I claim—

1. A spring consisting of a lower leaf or leaves curved longitudinally downward toward the ends, at one end curving upward, a leaf or leaves curving upward from the center and having one end bent into an S-shaped curve, the two parts being secured together, and a V-shaped leaf secured to both parts of the spring near each end, substantially as and for the purpose specified.

2. A vehicle having a transverse bar secured to its body pivotally, and provided with collars to prevent side movement and pivoted to the side bars, and a central spring consisting of two parts connected about centrally and curving in opposite directions, one part having one end formed into a simple curve, and the other part having one end formed into an S curve, and V-shaped leaves connecting the diverging portions of the spring, substantially as and for the purpose specified.

In testimony whereof I affix my signature in presence of two witnesses.

JOSEPH HUTCHINS.

Witnesses:
  W. H. GASS,
  W. C. STIERLIN.